United States Patent [19]
Zajec

[11] Patent Number: 6,065,464
[45] Date of Patent: May 23, 2000

[54] CHARCOAL GRILL DIVIDING COOKING APPARATUS

[76] Inventor: Alois Zajec, 417 Casa Del Mar, Half Moon Bay, Calif. 94019

[21] Appl. No.: 09/299,331

[22] Filed: Apr. 26, 1999

[51] Int. Cl.[7] .................................................. F24B 3/00
[52] U.S. Cl. ...................................... 126/25 R; 126/25 B
[58] Field of Search ................................ 126/25 R, 25 B

[56] References Cited

U.S. PATENT DOCUMENTS

| | | |
|---|---|---|
| 984,791 | 2/1911 | Beehler . |
| 2,740,395 | 4/1956 | Goodwin . |
| 2,797,633 | 7/1957 | Goodwin . |
| 3,270,737 | 9/1966 | Horine . |
| 3,494,349 | 2/1970 | Allen . |
| 4,515,074 | 5/1985 | Iverson . |
| 5,163,358 | 11/1992 | Hawagan et al. ............ 126/25 R |
| 5,404,864 | 4/1995 | Kent, Jr. . |
| 5,615,666 | 4/1997 | Ransom . |

*Primary Examiner*—Carroll Dority
*Attorney, Agent, or Firm*—Hickman Stephens Coleman & Hughes, LLP

[57] ABSTRACT

This invention provides charcoal cookers the ability to concentrate the fuel and to be able to remove the divider without disrupting the grill or food cooking on it while in operation. The invention further provides charcoal cookers with the ability to reposition a charcoal grill divider of this invention without disrupting the grill or food cooking on it while in operation.

18 Claims, 7 Drawing Sheets

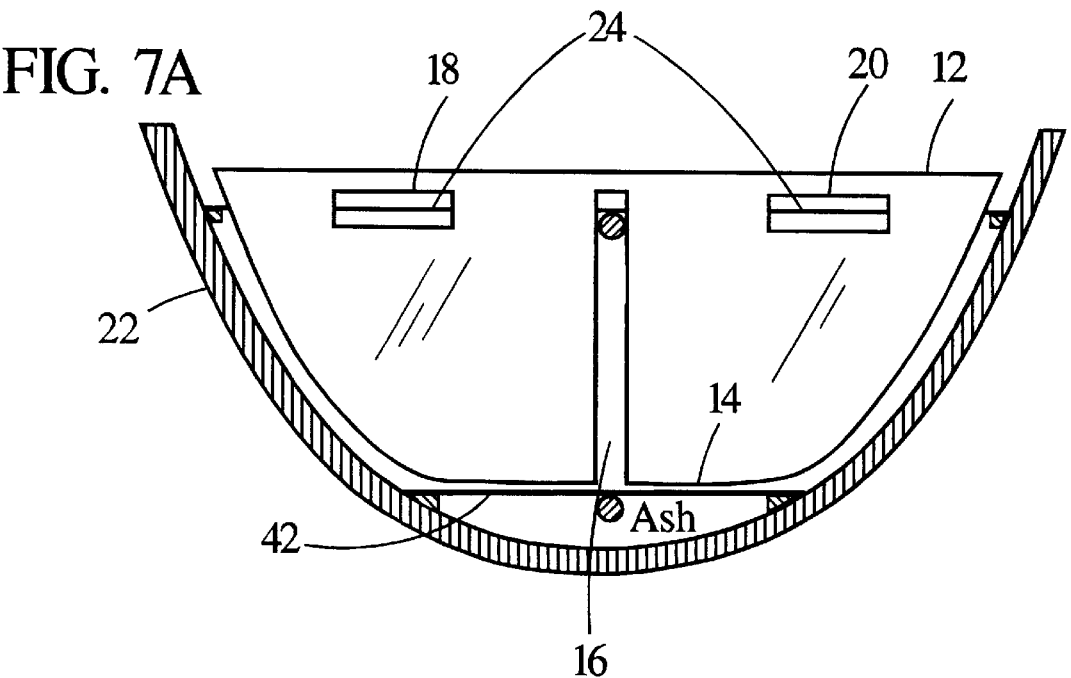
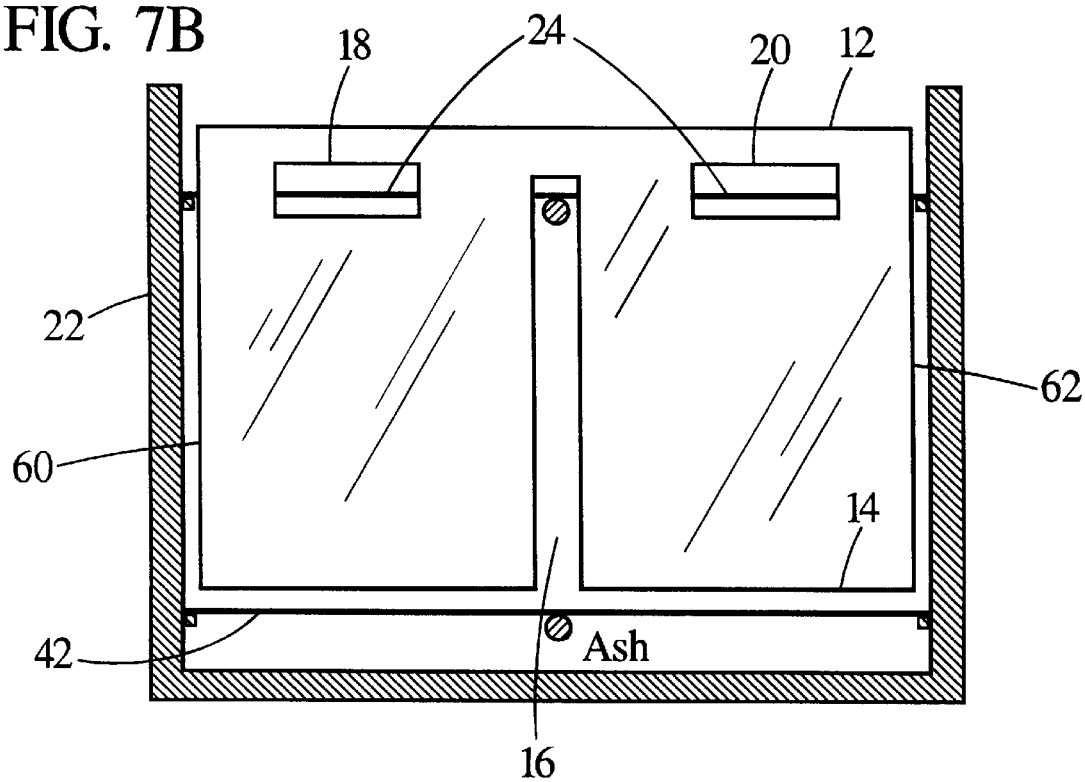

CHARCOAL GRILL DIVIDING COOKING APPARATUS

BACKGROUND OF THE INVENTION

The present invention generally relates to charcoal barbecues, more particularly, to dividers for barbecues to use fewer coals when heating smaller portions of the barbecues.

PRIOR RELATED ART

There are many charcoal cooking devices in production and wide-scale use that include a bowl or well where the charcoal may be burned. To cook food held above the well, by for example, a grill or spit, charcoal is ignited within the well to heat the entire volume of the well. This is wasteful of fuel and cooking time when the item or items to be cooked only cover, for example, a small portion of the grate.

Several inventions have addressed this basic problem. The basic approach has been to partition the well with one or more dividers. Charcoal can then be placed in selected portions of the well to concentrate the heat of the burning charcoal over a smaller portion of the grill.

Prior art charcoal grill dividers tend to be difficult to remove and reposition while the barbecue is in operation. That is, almost all prior solutions require the removal of the grill and whatever may be cooking on it to effect the removal of the divider. This can be seen in U.S. Pat. No. 5,615,666, of Ransom, U.S. Pat. No. 5,404,864, of Kent, U.S. Pat. No. 4,515,074, of Iverson, U.S. Pat. No. 3,270,737, of Horine and U.S. Pat. No. 3,494,349, of Allen.

Charcoal dividing cooking apparatuses are disclosed in U.S. Pat. Nos. 2,740,395 and 2,797,633 both by Goodwin where the grill is easier to remove and replace while adjustments were being made to the charcoal grill divider. However, removal and replacement of a large, hot grill, possibly laden with cooking food still poses a problem.

SUMMARY OF INVENTION

A charcoal grill divider in accordance with the present invention is made of an essentially flat sheet metal member provided with an elongated central slot opening on a bottom edge and extending towards a top edge. The divider is preferably further provided with a handle near the top edge of the member. This permits a vertical lifting force to be imparted on the member.

The charcoal grill divider forms a part of a charcoal cooking device of the present invention. The charcoal cooking device includes a bowl which provides an interior well, and a grate positioned near the top of the well. The grate provides a surface upon which food is grilled. This grate will be referred as the grill from hereon. The charcoal grill divider engages the grill in any one of a number of positions to partition the well. Preferably, the lower surface of the divider is configured similarly to the inner surface of the bowl.

An advantage of the present invention is that the since the divider engages the top of the grill rather than being positioned below the grill, it can be removed and repositioned during the use of the cooking device without requiring the removal of the grill. Further, the divider can be constructed in a durable, yet inexpensive fashion, and is well adapted for retrofitting into barbecue cooking devices of many types and sizes.

These and other advantages of the present invention will become apparent upon a study of the following specification and drawings.

BRIEF DESCRIPTION OF THE DRAWINGS

FIG. 7A is a view of the use of one alternate embodiment of a charcoal grill divider including a rounded bottom edge for barbecues with an essentially rounded interior well; and FIG. 7B is a view of the use of one alternate embodiment of a charcoal grill divider including a rectangular or square shape formed of the bottom edge and side edges for barbecues with an essentially rectangular or square interior well.

DETAILED DESCRIPTION OF THE INVENTION

Figure 1:
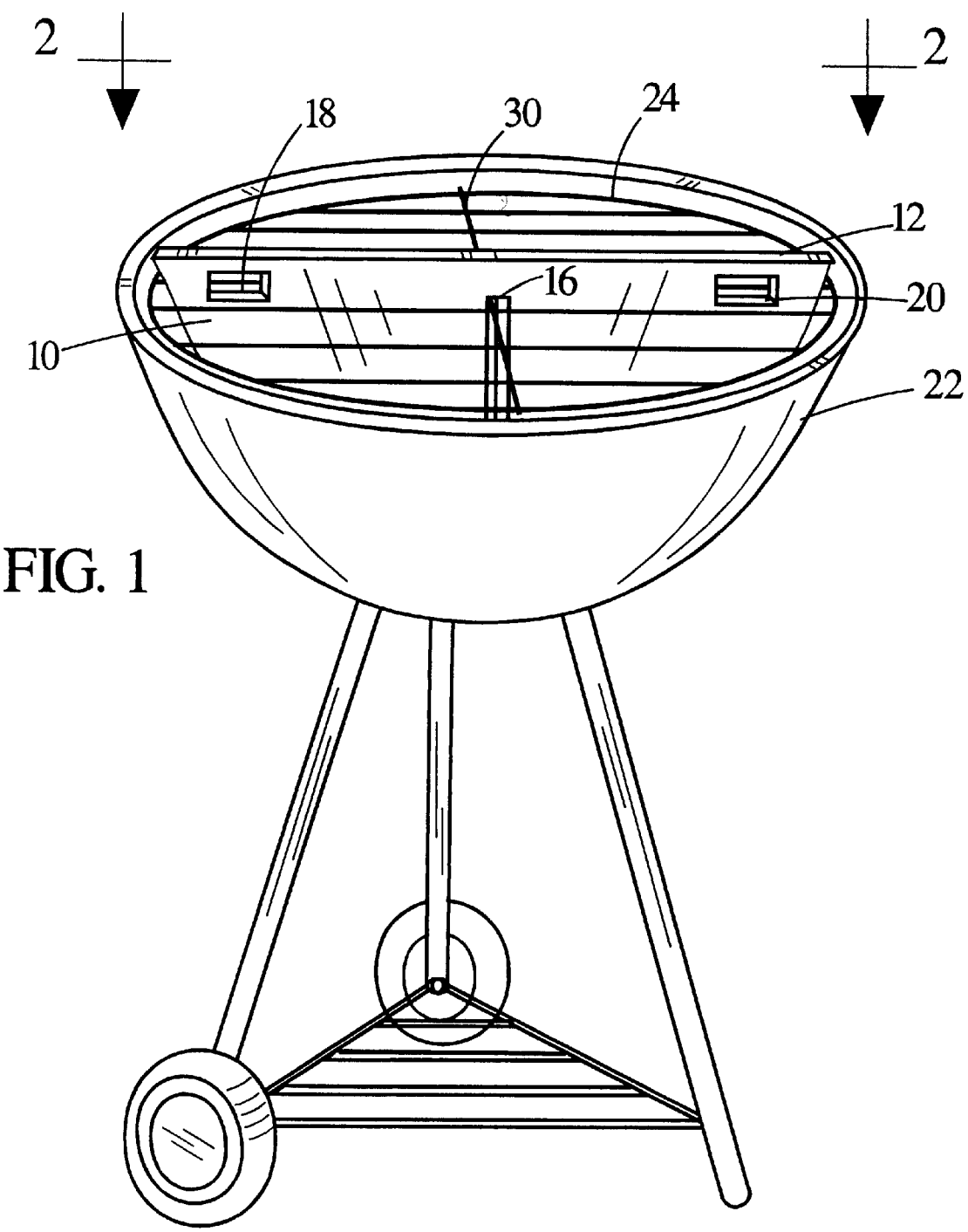
FIG. 1 is a perspective view of a charcoal dividing cooking apparatus of the present invention.

FIG. 1 is a perspective view of a charcoal dividing cooking apparatus of the present invention. The charcoal grill divider 10 has been inserted through grill 24, with its central slot 16 inserted around the central bar 30 of the grill 24.

The charcoal grill divider is further provided with two slots 18 and 20 which are located near the top edge 12 of the charcoal grill divider 10. These two slots provide handles by which the charcoal grill divider can be removed from the charcoal cooker while the charcoal is hot, without the necessity of disturbing the grill, or the food which might be cooking on the grill. Note that these slots allow for its removal either by using insulated mittens or alternatively by using cooking forks and other utensils.

Note that essentially flat sheet metal members refers to a sheet metal member which is flat enough to fit in the space between two bars of a grill or grate.

Sheet metal will refer herein to metal formed so as to have a sheet-like constitution and a relatively uniform thickness. The term steel used herein will refer to iron-based compositions of matter, whether or not they possess significant amounts of other elements, including but not limited to stainless steel. Note that other metals could be used herein without altering the intended scope of the claims. Such metals as bronze, brass, aluminum to name just a few could be used in place of steel. The only requirements would be a high enough melting point as well as sufficient ductility or malleability to be economically formed into a sheet. While these metals are feasible, steel often possesses the advantage of low cost and ready availability. As such, steel in one form or another is a preferred embodiment.

A number of charcoal cookers, including but not limited to the Weber™ charcoal cookers, possess an interior well almost exactly the same shape as the exterior shape or shell 22 enclosing the interior well. For the sake of simplicity 22 will refer hereafter to the basic shape of the interior well and also to the wall or shell from which it is constructed.

Within this document, the discussion of charcoal cookers will be limited to a discussion of the operation of a single well of a charcoal cooker. Multiple well charcoal cookers will be considered in terms of viewing of each well independent of any other wells.

Figure 2:
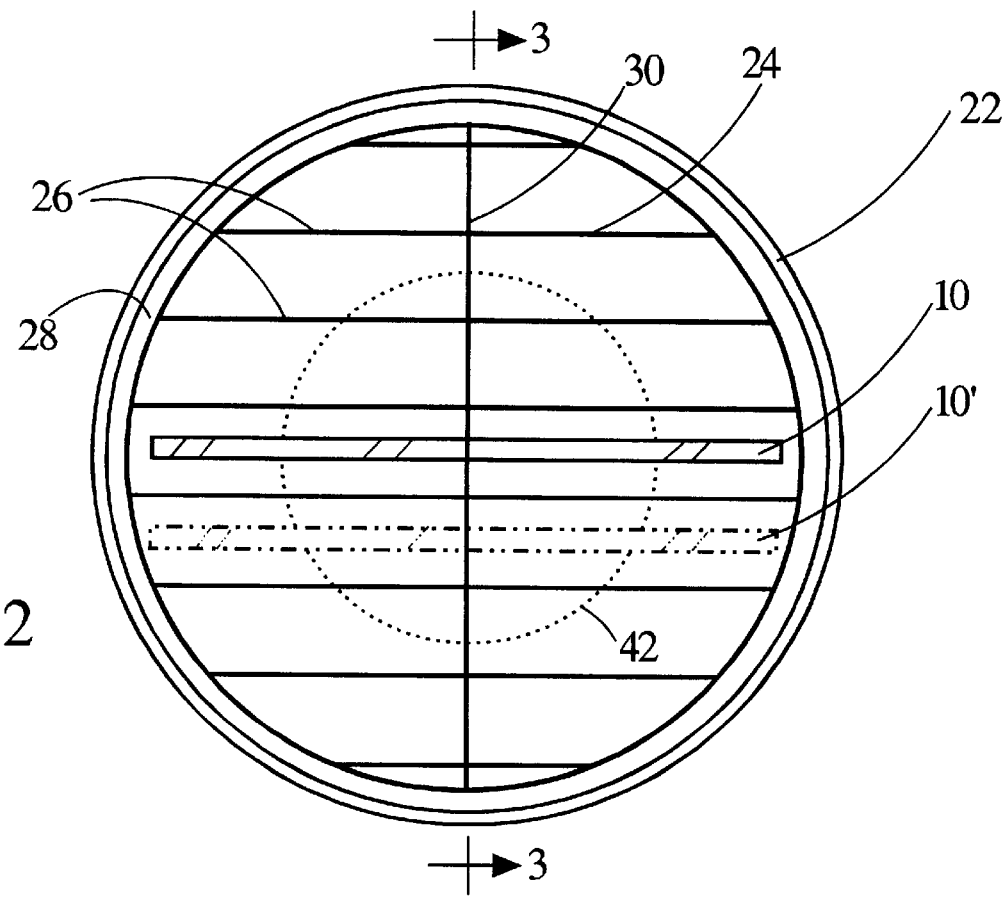
FIG. 2 is a top plan view taken along line 2—2 of FIG. 1.

FIG. 2 is a top plan view taken along line 2—2 of FIG. 1. Two charcoal grill dividers 10 and 10' are shown inserted into grill 24. Grill 24 is further shown with rim 28 and central bar 30, with multiple crossbars 26 traversing the central bar 30 in the perpendicular. The interior well is seen from this perspective to be predominantly defined by shell 22.

Figure 3:
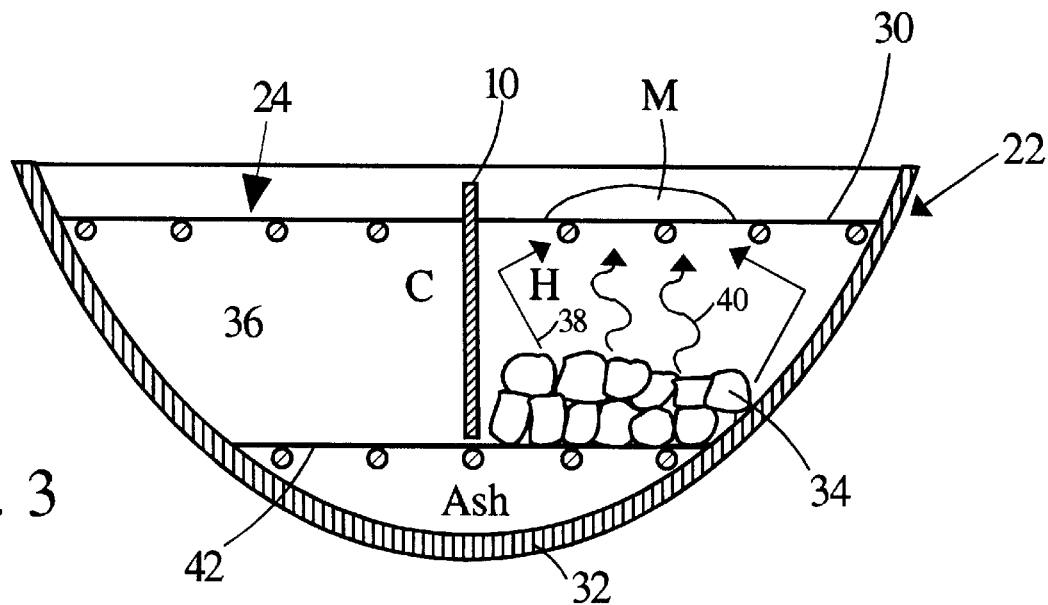
FIG. 3 is a cross-sectional view taken along line 3—3 of FIG. 2.

FIG. 3 is a cross section view taken along line 3—3 of FIG. 2. The meal M is shown placed on grill 24. Charcoal grill divider 10 concentrates the charcoal 34 and heat in a smaller area by creating a region of either equal temperature using fewer coals or higher temperature H closing off the side of the grill opposite the divider C, making that side cooler. The charcoal grill divider 10 extends through grill 24 close to bottom grate 42 upon which the charcoal 34 is burning. The heating effect in region H occurs by the combining effects of radiant heat 40 from the charcoal as well as heat 38 reflected off the walls of the interior well 22 and the surface of the charcoal grill divider 10.

This figure discloses a spacing between charcoal grill divider 10 and charcoal grate 42. In some preferred embodiments, charcoal grill divider 10 directly engages charcoal grate 42. In some further preferred embodiments, charcoal grill divider 10 passes through charcoal grate 42. Further note the spacing between the bottom of the bowl shape and the charcoal grate which has been designated Ash. This is a commonly occurring configuration with charcoal cookers, allowing the ash to fall through the grate and permit better air circulation for the burning charcoal.

Figure 4:
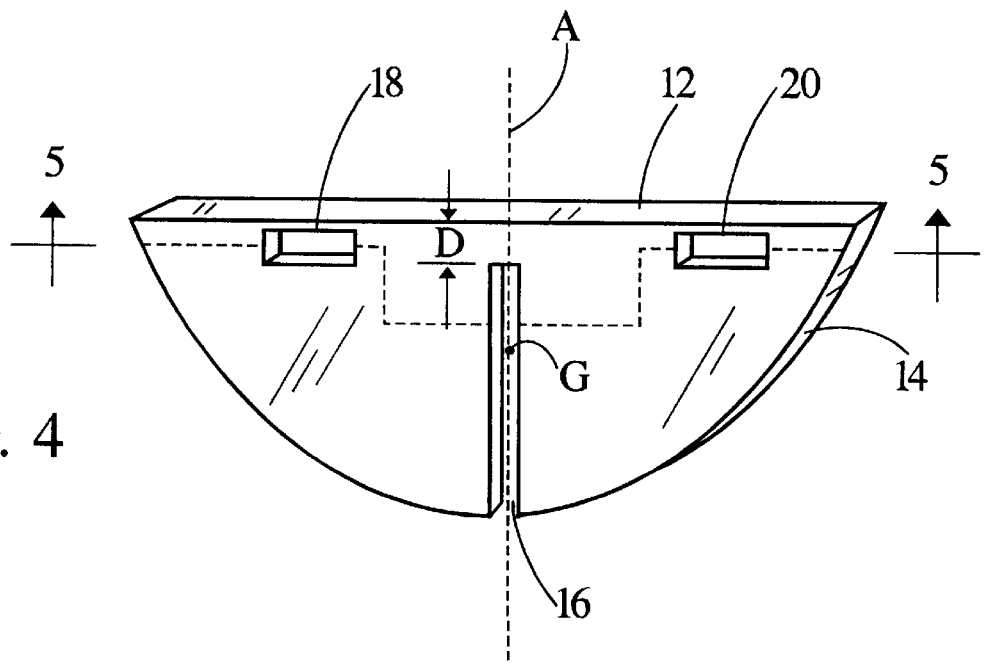
FIG. 4 is a perspective view of a charcoal grill divider of the present invention.

FIG. 4 is a perspective view of one charcoal grill divider embodiment. Central slot 16 is shown proximate to an axis A which runs close to the center of mass G of the charcoal grill divider 10. The top edge of the central slot 16 is seen to be within first distance D of the top edge 12 of the charcoal grill divider. The bottom edge 14 is seen to be approximately the shape of the interior well of the charcoal cooker 22 of FIG. 1.

Slots 18 and 20 provide handles by which the charcoal grill divider can be removed from the cooker when in operation. Note that while slots 18 and 20 are shown as parallel, rectangular slots to the top edge, they neither need to be rectangular, nor parallel to the top edge. Other shapes, including but not limited to approximately rectangular with rounded vertices, circular, elliptical, triangular, pentagonal and semi-circular are all effective and are claimed within the scope of this invention and its patent. Note that these charcoal grill divider embodiments can be grabbed from the sides and lifted or inserted.

In a preferred embodiment, D is preferably greater than ½ inch. In a further preferred embodiment, D is preferably greater than 1 inch. D can be of greater or lesser size based upon the need for strength, durability and rigidity of the member in the various settings in which it is used.

Figure 5:
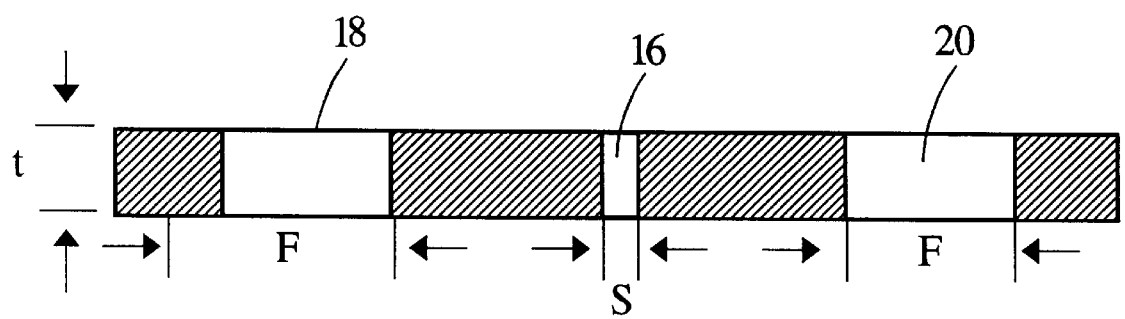
FIG. 5 is a cross-sectional view taken along line 5—5 of FIG. 4.

FIG. 5 is a cross-sectional view taken along line 5—5 of FIG. 4 showing the slot widths of the charcoal grill divider embodiment of FIG. 4. FIG. 5 shows the slot widths of the charcoal grill divider embodiment and thickness t of the charcoal grill divider member. The thickness t may vary over the divider by as much as 15% without degradation of performance. It is therefore claimed within the scope of this invention's patent. Note that slots 18 and 20 have width F. Central slot 16 has width S.

In a preferred embodiment, member thickness t is approximately ¹⁄₁₆ inch. Such thickness may vary with the cost and availability of sheet metal stock, as well as the specific requirements for rigidity and durability of the member in the various settings in which it is used. Primary requirements include the member thickness t sufficiently large so the sheet metal member has the necessary rigidity and small enough that the sheet metal member readily fits through the grill in operation.

In a preferred embodiment, the slots 16 and 18 width F is greater than 1 inch. This affords barbecue forks or other utensils easy access to the handles. In a further preferred embodiment, the slots 16 and 18 width F is greater than 2½ inches to further support gloved hands removing the charcoal grill divider from the charcoal cooker.

In a preferred embodiment, the central slot width S is greater than or equal to approximately ¼ inch. This width provides for sufficient clearance for a typical central bar of the grill to slide through the member's central slot. In situations where the central bar of the barbecue grill is thicker, the central slot width S will need to be larger.

As used herein, charcoal will refer herein to charcoal, coal and various substances composed of wood and other combustible materials, including but not limited to hardwood pieces of various sizes and shapes as well as composite materials made of compressed particles such as ground olive pits and/or sawdust of various sizes and shapes.

Charcoal cookers will be considered herein as possessing an interior well in which the charcoal may be burned and essentially over which the food may be cooked. An interior well will be considered also to optionally include a grate upon which the charcoal may be placed for burning.

Figure 6A:
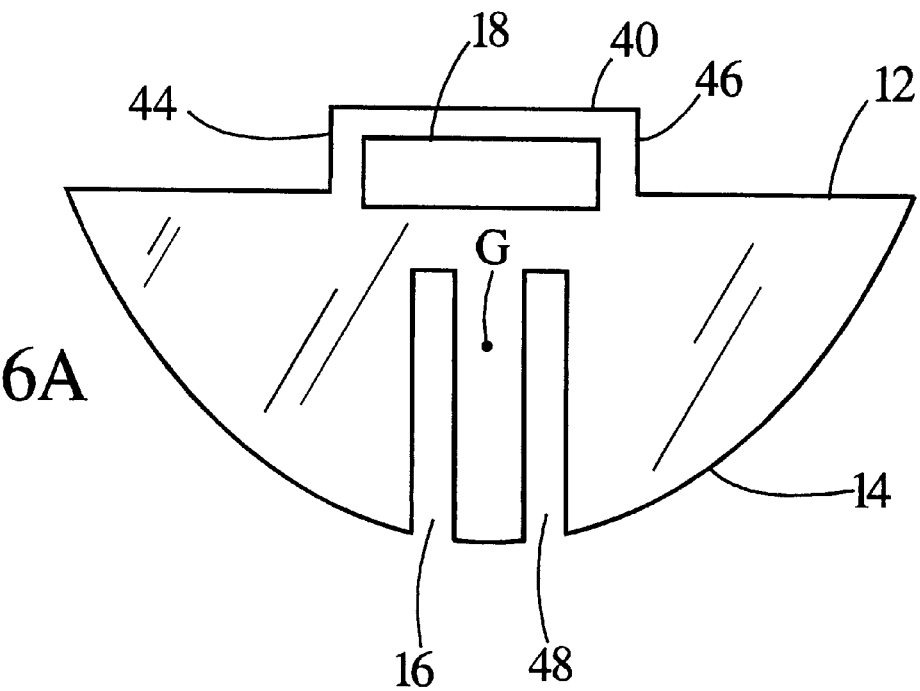
FIG. 6A is a view of an alternate embodiment of a charcoal grill divider of the present invention.

FIG. 6A is a view of one preferred embodiment possessing a handle stamped from sheet steel and two elongated central slots extending from the bottom edge. Central slots 16 and 48 are shown approximately parallel each other essentially equidistant to the center of mass G of the charcoal grill divider member. Embodiments possessing two central elongated slots are useful in situations where the grill possesses two or more, rather than one, central bar upon which the cross pieces are attached in a perpendicular pattern to the two central cross bars.

Note that there is only one handle 18 in this preferred embodiment. This handle 18 is composed of a top piece 40 attached by two side pieces 44 and 46 to the charcoal grill divider member. Note that the handle 18 extends above the top edge 12, so that the top of the charcoal grill divider member includes 12, 46, 40 and 44. Note that the top of the charcoal grill divider member may also be curved or additionally a combination of curved and polygonal. All such variations are claimed within the scope of this invention's patent.

Figure 6B:
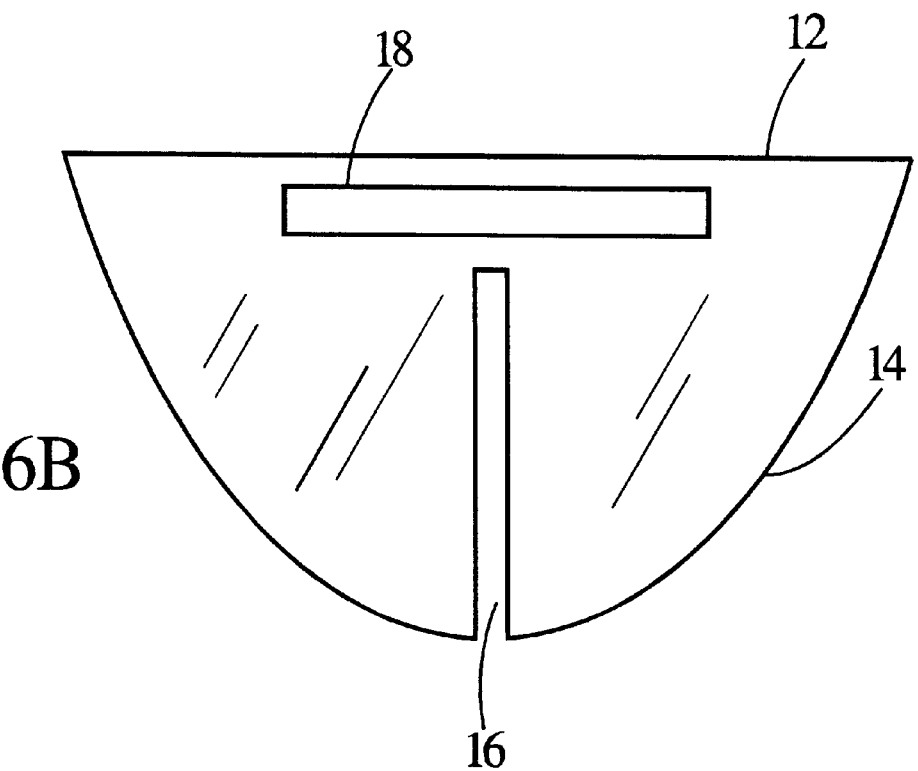
FIG. 6B is a view of an alternate embodiment of a charcoal grill divider of the present invention.

FIG. 6B is a view of one preferred embodiment possessing a different handle 18 stamped from sheet steel. Note that this invention's patent claims all ratios between height and width that can be encompassed and still leave enough sheet metal for mechanical requirements of strength and durability to be maintained. The handle slot 18 in such embodiments is wide enough that two forks or other utensils inserted through the slot at extreme ends of the slot can be used to lift the member out of the grill in a similar manner to two separate, smaller slots in embodiments as shown in FIG. 4.

Figure 6C:
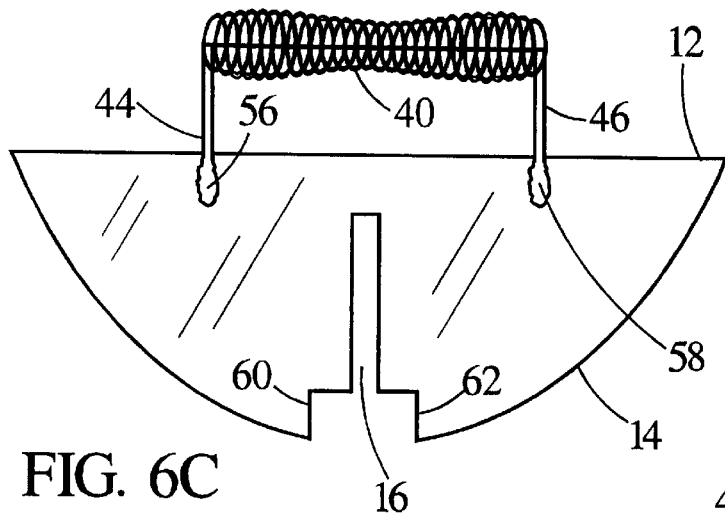
FIG. 6C is a view of an alternate embodiment of a charcoal grill divider of the present invention.

FIG. 6C is a view of one preferred embodiment possessing a wound wire grip handle. The handle is composed of a top piece made of wound wire 40, as well as two side pieces 44 and 46 which attach to the charcoal grill divider member at 56 and 58. In a further preferred embodiment, attachments 56 and 58 caused by welding 44 and 46 respectively to the charcoal grill divider member. Note that in a further preferred embodiment, the top piece of the handle 40 may contain a sheet metal component continuously formed with side pieces 44 and 46.

The central slot 16 is further provided with notches 60 and 62. These notches provide clearance for a double central bar on the charcoal grate. This is a common feature on several charcoal cookers in production, including some models of Weber™ charcoal cookers.

Figure 6D:
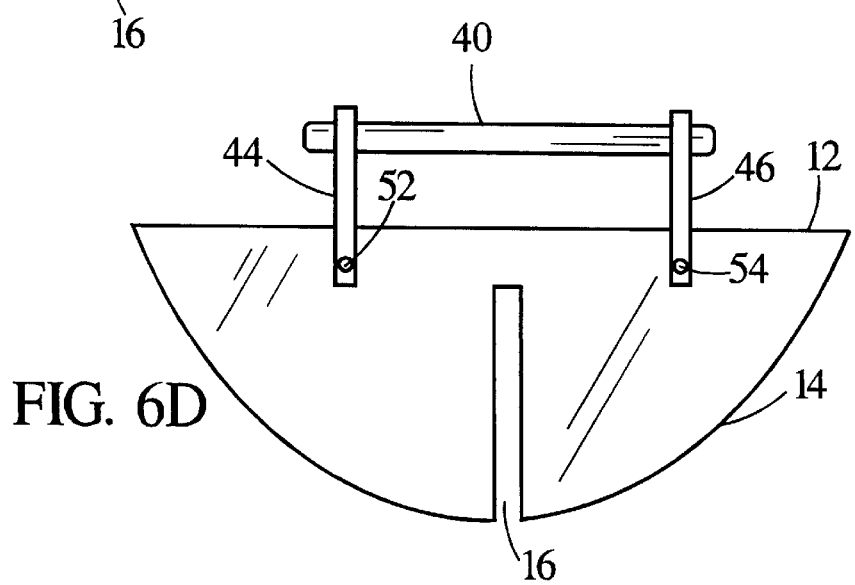
FIG. 6D is a view of an alternate embodiment of a charcoal grill divider of the present invention.

FIG. 6D is a view of one preferred embodiment possessing an insulated piece 40 as part of the handle. The handle insulated piece 40 is attached to side pieces 44 and 46 which are further attached to the charcoal grill divider member at 52 and 54 respectively. In one preferred embodiment, these attachments 52 and 54 are made with rivets. In a further preferred embodiment, these attachments are made with screws. In a further preferred embodiment, these attachments are made with nuts and bolts. In a further embodiment, these attachments are made with nuts and bolts with locking washers being applied between the nuts and bolts.

Figure 6E:
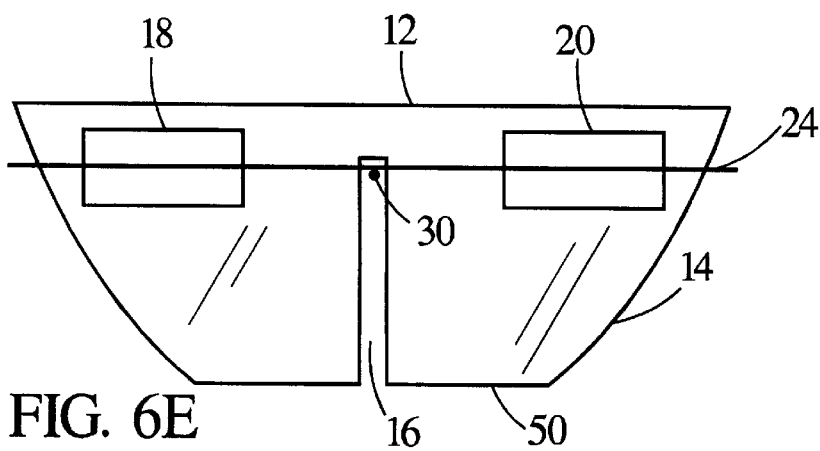
FIG. 6E is a view of an alternate embodiment of a charcoal grill divider of the present invention.

FIG. 6E is a view of one preferred embodiment possessing two handles formed as slots and a flattened bottom edge which is otherwise curved. The two handles 18 and 20 extend below the grate 24. The flattened component 50 of the bottom edge 14 is useful in situations where the interior well has essentially a curved cross section which is truncated. In situations where the grill can be positioned at various depths above the coals, the handles remain useful at the entire range of useful depths at which the grill may be positioned. Thus, in some grill positions, the handle slots may preferably extend beneath the grill.

Figure 6F:
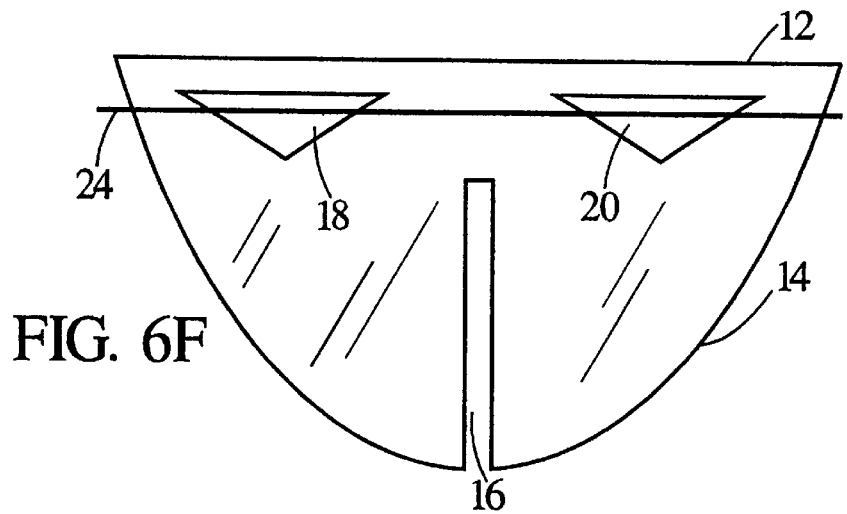
FIG. 6F is a view of an alternate embodiment of a charcoal grill divider of the present invention.

FIG. 6F is a view of one preferred embodiment possessing two handles 18 and 20 formed as triangular slots. In some preferred embodiments, handles 18 and 20 may be formed of triangular slots with different relative side lengths. In some further preferred embodiments, handles 18 and 20 may have no corresponding sides which are approximately parallel. Such handles can provide not only the utility of handles but also aid in personalizing charcoal grill dividers.

Figure 6G:
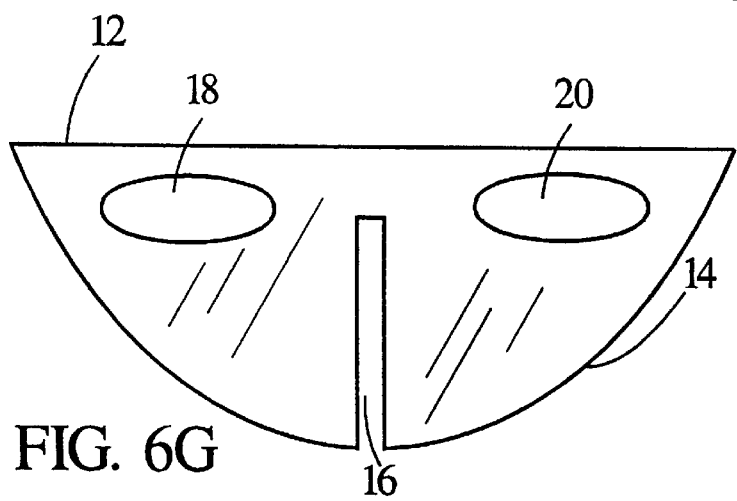
FIG. 6G is a view of an alternate embodiment of a charcoal grill divider of the present invention.

FIG. 6G is a view of one preferred embodiment possessing two handles 18 and 20 formed as approximately elliptical slots. In some preferred embodiments, the major axes of these ellipses are not collinear, which can serve to personalize this and similar preferred embodiments.

Figure 6H:
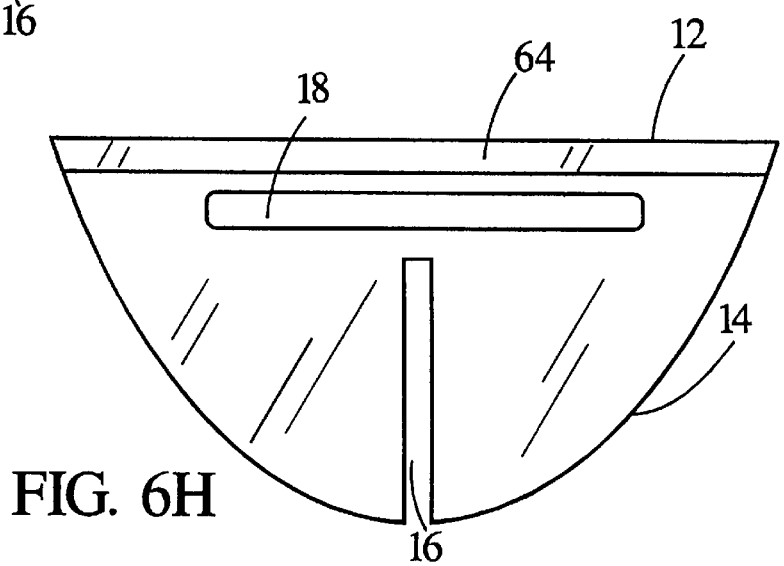
FIG. 6H is a view of an alternate embodiment of a charcoal grill divider of the present invention.

FIG. 6H is a view of one preferred embodiment possessing one rectangular slot handle 18 with rounded sides. In some preferred embodiments, handles formed in any manner previous described may be formed with rounded edges. Handles as seen in this preferred embodiment are effective not only for their utility, but also to satisfy a preference on the part of many for objects with rounded shapes.

FIG. 7A is a view of the use of one preferred embodiment possessing two handles formed as slots and a round bottom edge 14 in charcoal cookers with an essentially round interior well 22. The bottom edge 14 of the sheet metal member is approximately the same shape as the interior well 22, providing a close fit for the member when inserted through the grill. This is advantageous for use in many charcoal cookers, including many models of Weber™ barbecues. In some further circumstances, the bottom edge 14 of the sheet metal member is flattened to conform to interior wells 22 which are essentially rounded, with a flattened section near the bottom of the interior well. Such interior wells have a flattened bottom region often due to a grate at the bottom of the interior well upon which coals are burned.

FIG. 7B is a view of the use of one preferred embodiment possessing two handles formed as slots and a rectangular or square bottom edge 14 in charcoal cookers with an essentially rectangular or square interior well 22. The left edge 44 and right edge 46 together with the bottom edge 14 are approximately the shape of the essentially rectangular interior well. This provides an advantageously close fit when the charcoal grill divider is in operation. It may be further preferred for the charcoal grill divider to engage the grate, providing additional advantageous stability during operation. Note that essentially rectangular or square interior wells 22 are often found in brick charcoal barbecues.

Although several embodiments of the present invention have been described, it should be understood that the present invention may be embodied in many other specific forms without departing from the spirit or scope of the invention.

I claim:

1. A charcoal grill divider comprising a flat sheet metal member provided with a top edge and a bottom edge, said sheet metal member being provided with an elongated central slot opening on said bottom edge and extending towards said top edge, where a top of said central slot is separated from said top edge by a first distance, and further provided with a handle proximate to said top edge, permitting a vertical lifting force to be imparted on said member.

2. A charcoal grill divider as in claim 1 wherein said handle is located above said top edge.

3. A charcoal grill divider as in claim 2 wherein said handle further comprises a heat insulating component.

4. A charcoal grill divider as in claim 1 wherein said handle includes at least one slot having a top edge located no lower than said first distance from said first top edge.

5. A charcoal grill divider as in claim 4 wherein said handle includes at least two slots each having a top edge located no lower than said first distance from said top edge.

6. A charcoal grill divider as in claim 1 wherein said central slot is proximate to an axis which goes through a center of mass of said divider.

7. A charcoal grill divider as in claim 1 wherein said divider is approximately rectangular, and wherein said bottom edge is substantially linear.

8. A charcoal grill divider as in claim 1 wherein said bottom edge is shaped to approximate the shape of a curved charcoal cooker interior well.

9. A charcoal grill divider as in claim 8 wherein said bottom edge is approximately semi-circular.

10. A charcoal grill divider as in claim 8 wherein said bottom edge is approximately elliptical.

11. A charcoal grill divider as in claim 8 wherein said bottom edge is approximately a truncated curve.

12. A charcoal grill divider as in claim 1 further comprising a second elongated central slot opening on said bottom edge and extending towards said top edge, where a top of said second slot is separated from said top edge by the first distance and wherein said first and second central slots are essentially parallel to each other and are approximately equidistant from a center of mass of said divider.

13. A charcoal cooking device comprising a charcoal cooker having an interior well upon which coals may burn and a grill positioned above said interior well upon which food may be placed to cook, the charcoal cooker further having a charcoal grill divider comprising a flat sheet metal member provided with a top edge and a bottom edge, said sheet metal member being provided with an elongated central slot opening on said bottom edge and extending towards said top edge, where a top of said central slot is separated from said top edge by a first distance, and further provided with a handle proximate to said top edge, said charcoal grill divider being positioned through said grill wherein said top edge is above said grill, said bottom edge is proximate said interior well and said handle permits a lifting force to be applied to lift said charcoal grill divider without disrupting said food on said grill.

14. A charcoal cooking device as in claim 13 wherein said grill possesses an essentially straight first bar and said charcoal grill divider elongated slot fits over said first bar with said bottom edge in contact with said interior well.

15. A charcoal cooking device as in claim 13 wherein said interior well is comprised of a charcoal grate and a lower surface below said charcoal grate.

16. A charcoal cooking device as in claim 15 wherein said bottom edge can be positioned below and through said charcoal grate.

17. A charcoal cooking device as in claim 14 wherein said grill further comprises a second bar and wherein said second bar is essentially straight and approximately parallel to said first bar, said charcoal grill divider further comprising a second elongated slot wherein said first and second slot fit over said first and second bar respectively with said bottom edge in contact with said interior well.

18. A method of cooking food on a charcoal cooking device as in claim 13 comprising the steps of placing charcoal upon said interior well; igniting said charcoal; placing the grill upon said charcoal cooker; placing said charcoal grill divider upon said grill in such manner so as to concentrate said ignited charcoal; placing food upon said grill over said ignited charcoal and removing food from said grill when appropriately cooked.

* * * * *